United States Patent [19] | [11] 4,115,613
Inoue et al. | [45] Sep. 19, 1978

[54] HEAT-SENSITIVE RECORDING MATERIALS AND RECORDING PROCESS OF USING THE SAME

[75] Inventors: Eiichi Inoue; Taiji Nose, both of Tokyo; Masakazu Inaba, Higashimurayama, all of Japan

[73] Assignee: Process Shizai Co., Ltd., Tokyo, Japan

[21] Appl. No.: 753,136

[22] Filed: Dec. 22, 1976

[30] Foreign Application Priority Data

Dec. 30, 1975 [JP] Japan ................................ 50-158479

[51] Int. Cl.$^2$ .......................... B32B 3/10; B41M 5/18

[52] U.S. Cl. .................................. 428/207; 96/27 R; 427/145; 427/148; 427/264; 428/208; 428/323; 428/327; 428/328; 428/329; 428/913

[58] Field of Search ....................... 427/145, 264, 148; 428/913, 199, 206, 207, 208, 323, 327, 328, 329; 282/27.5; 96/27 R

[56] References Cited

U.S. PATENT DOCUMENTS

| | | | |
|---|---|---|---|
| 3,476,578 | 11/1969 | Brinckman | 428/913 |
| 3,539,375 | 11/1970 | Baum | 428/913 |
| 3,580,719 | 5/1971 | Brinckman | 96/27 R |
| 3,896,255 | 7/1975 | Kato et al. | 428/411 |

*Primary Examiner*—Thomas J. Herbert, Jr.
*Attorney, Agent, or Firm*—Sughrue, Rothwell, Mion, Zinn and Macpeak

[57] ABSTRACT

Heat-sensitive recording materials having a recording layer comprising a soluble heat-sensitive organic high molecular weight compound which is folded to show a granular state on a support, and a recording process for obtaining images which comprises imagewise applying heat to the recording layer to insolubilize the high molecular weight compound and removing by dissolving the portion of the recording layer where the high molecular weight compound is not insolubilized.

23 Claims, No Drawings

HEAT-SENSITIVE RECORDING MATERIALS AND RECORDING PROCESS OF USING THE SAME

BACKGROUND OF THE INVENTION

1. Field of the Invention

The present invention relates to heat-sensitive recording materials and a recording process for using the same. In more detail, the present invention relates to heat-sensitive recording materials using a soluble material which becomes insoluble by application of heat energy and a process for using the same.

2. Description of the Prior Art

Hitherto, various heat-sensitive recording materials and processes for using the same are known. For example, Japanese Patent Publication No. 9718/69 discloses that images are obtained by increasing the degree of swelling or the dissolution rate in water of portions of a heat-sensitive recording layer, composed of gelatin as a main ingredient, to which heat has been applied. Japanese Patent Publication No. 27919/71 discloses heat-sensitive recording materials comprising a heat-sensitive recording layer composed of a certain type of natural high molecular weight compound or synthetic high molecular weight compound, which are processed with a liquid capable of selectively removing portions of the recording layer which have been heated. The above described heat-sensitive recording layers are all characterized in that the degree of swelling and the dissolution rate increase in portions where heat was applied.

On the other hand, Japanese Patent Publication No. 9716/69 discloses recording materials comprising a heat-sensitive recording layer composed of polyvinyl alcohol having 95% or more vinyl alcohol units as a main ingredient, in which the water permeability, swelling property or dissolution rate of the recording layer is reduced by application of heat to the recording layer.

However, in these materials it is difficult to reduce the water permeability, the swelling property or the dissolution rate of the recording layer to the degree necessary to form practical images by application of heat. Admixing finely divided thermoplastic hydrophobic materials such as polyethylene, etc., to the heat-sensitive layer has been proposed to improve the above described defect.

SUMMARY OF THE INVENTION

An object of the present invention is to provide heat-sensitive materials in which sufficient insolubilization is achieved by application of comparatively low amount of heat energy without adding thermoplastic hydrophobic materials and a process for obtaining images with using the same.

Namely, the present invention provides a heat-sensitive recording material comprising a support and a recording layer of a soluble heat-sensitive organic high molecular weight compound which is folded to show a granular state thereon.

In another embodiment, the present invention provides a recording process for obtaining images which comprises imagewise applying heat to the recording layer to insolubilize the high molecular weight compound and removing by dissolving the portion of the recording layer where the high molecular weight compound is not insolubilized.

DETAILED DESCRIPTION OF THE INVENTION

According to the present invention, since the high molecular weight compound in the portion which was heated becomes insoluble, images composed of an insoluble high molecular weight compound are obtained by development which comprises removing by dissolving the portion of the recording layer where heat was not applied.

In the present invention, the organic high molecular weight compound which is folded and exhibits a granular state means a high molecular weight compound in a three-dimensional state, namely, globular, spindle-shaped, plate, rod or cubic state (a folded state of plates) which was formed by bending or folding a linear high molecular weight compound in a spiral state.

Examples of these high molecular weight compounds which can be used in the present invention are those which are soluble in certain kinds of solvents. Although the solvent used is not particularly restricted, e.g., polar solvents having a dielectric constant greater than about 10, such as, for example, water, methyl alcohol, ethyl alcohol, n-propyl alcohol, isopropyl alcohol, ethylene glycol, glycerin, acetonitrile, N,N-dimethylformamide, acetone, methyl ethyl ketone, methyl isobutyl ketone, ethylene glycol monomethyl ether, ethylene chloride and the like, and mixtures thereof are suitable from the viewpoint of ease of handling or economic reasons. Accordingly, it is preferred to choose high molecular weight compounds which are soluble in solvents such as those described above. A suitable solubility for the high molecular weight compound ranges from about 1 to about 40% by weight, preferably 5 to 30% by weight in the polar solvent. In practice, a solution having a concentration as high as about 30% by weight can be used in preparing a coating solution, but in order to achieve a folded state for the high molecular weight compound, the concentration of the coating solution is adjusted to a concentration of less than about 10% by weight.

Examples of high molecular weight compounds which are soluble in water or polar solvents or both in water and polar solvents include globular proteins such as globulin, glutelin, prolamine or histone; water soluble acrylic high molecular weight compounds represented by the following formula (I):

$$-\!\!\left(\underset{\underset{O}{\overset{\|}{C}}-R_1}{CH}-CH_2-\underset{\underset{O}{\overset{\|}{C}}-R_2}{CH}-CH_2\right)\!\!_n- \qquad \text{(I)}$$

wherein $R_1$ represents —OM (in which M represents H, an alkali metal such as Na or K, or $NH_4$) or $—NH_2$; $R_2$ has the same meaning as $R_1$ or additionally represents —OR (in which R represents an alkyl group having 1 to 12 carbon atoms such as methyl, ethyl, propyl, etc., or an aralkyl group having 7 to 12 carbon atoms such as benzyl, phenylethyl, phenylpropyl, etc.); and *n* is a positive integer of about 50 to about 1,000, preferably 100 to 500, such as sodium polyacrylate, partially saponified products of polyacrylic acid esters with a degree of saponification of about 20 to about 80%, preferably 40 to 60% or polyacrylamide, etc.; cellulosic water soluble high molecular weight compounds having a degree of etherification of about 10 to about 30%, which are represented by the following formula (II):

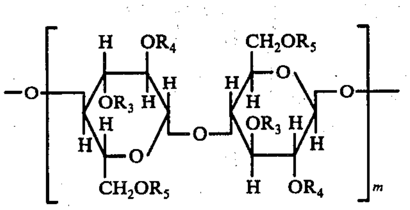

(II)

wherein $R_3$, $R_4$ and $R_5$ each represents an alkyl group having 1 to 4 carbon atoms such as methyl, ethyl, propyl, etc., or a hydroxyalkyl group having 1 to 4 carbon atoms such as hydroxymethyl, hydroxyethyl, etc.; and *m* is a positive integer of about 10 to about 20, such as methyl cellulose, hydroxyethyl cellulose, carboxymethyl cellulose, hydroxypropyl cellulose or ethyl hydroxyethyl cellulose, etc.; water-soluble high molecular weight compounds containing isobutylene such as isobutylene/maleic acid anhydride copolymers, the esters and salts thereof, etc.; styrenic water-soluble high molecular weight compounds such as styrene/maleic acid anhydride copolymers, styrene/crotonic acid copolymers or styrene/sulfonic acid copolymers, etc.; polyvinylpyrrolidone water-soluble high molecular weight compounds such as polyvinylpyrrolidone or polyvinylpyrrolidone/vinyl acetate copolymer, etc.; vinyl ether water soluble high molecular weight compounds such as polyvinyl methyl ether, vinyl methyl ether/maleic acid anhydride copolymers or the esters thereof, etc.; vinyl acetate water-soluble high molecular weight compounds such as vinyl acetate/maleic acid anhydride copolymers, vinyl acetate/crotonic acid copolymers or vinyl acetate/acrylic acid copolymers, etc.; vinyl alcohol/maleic acid anhydride copolymers; alginic acid high molecular weight compounds such as alginic acid, propylene glycol alginate, ammonium alginate or sodium alginate, etc.; ethylene oxide water-soluble high molecular weight compounds represented by the following formula (III):

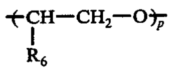

(III)

wherein $R_6$ represents H or $CH_3$; and *p* is a positive integer of about 5,000 to about 80,000, such as polyethylene oxide or polypropylene oxide, etc.; and polyethyleneimines represented by the following formula (IV):

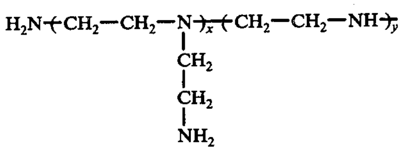

(IV)

wherein *x* and *y* are each a positive integer of about 2,000 to about 50,000, and the ratio of primary, secondary to tertiary nitrogen atoms is (0.1–2):(0.2–3):(0.1–2).

These above-described high molecular weight compounds are soluble in acid solvents or alkali solvents as well, such as dilute hydrochloric acid, dilute sulfuric acid, dilute sodium hydroxide aqueous solution, dilute potassium hydroxide aqueous solution, sodium carbonate aqueous solution and the like.

A suitable molecular weight for the high molecular weight compounds which can be used in the present invention can range from about 3,000 to about 3,000,000. When the molecular weight is below about 3,000, it is difficult to cause the high molecular weight compounds to form a folded state, whereas when the molecular weight is higher than about 3,000,000, such compounds become impractical due to their low solubility to solvents and high viscosity.

Preferred examples of the above-described compounds are high molecular weight compounds where water can be used for coating the recording layer composition on the support and for removing by dissolving the portion which is not insolubilized on heating.

A sufficient degree of polymerization of these high molecular weight compounds described above is such that the compounds are solid and easily dissolve in a solvent. A suitable molecular weight range for high molecular weight compounds which can easily be dissolved in a solvent varies greatly depending on the kind of compound, but a suitable range generally ranges from about 1,000 to about 5,000,000. A suitable molar ratio for the monomer units of the copolymers described above as examples of high molecular weight compounds is about 1:9 to about 9:1 and preferably 3:7 to 7:3. Examples of esters of the copolymers are alkyl esters such as the methyl, ethyl, propyl, isopropyl or butyl ester, and examples of salts are salts of alkali metals such as Li, Na or K.

These high molecular weight compounds do not have any intermolecular bonds, do not have a two-dimensional or three-dimensional structure such as a network structure and have a large number of solvent-philic groups such as hydrophilic groups (e.g., —OH, —COOH, $—NH_2$, —CONH, etc.) and a large number of solvent-phobic groups such as hydrophobic groups (e.g., —OR (R: alkyl or aryl), or —COOR (R: alkyl or aryl), $—CH_2—CH_2—$, etc.) or repeating units in the main chain. Since these high molecular weight compounds become oriented such that the solvent-philic groups are directed out and the solvent-phobic groups are directed in when they are dissolved in solvents, these compounds are applied as a layer on the support in such a manner that this orientation is not destroyed. It is believed that the high molecular weight compounds oriented in such a manner in the recording layer revert to their original linear orientation upon application of heat to expose a large number of solvent-phobic groups and, consequently, the compounds become insoluble in the solvents. In other words, the physical conversion of high molecular weight compound from a folded state into a linear state due to the application of heat results in solvent-phobic groups which are occluded in the molecule in the folded state being exposed and unshielded to form intermolecular bonds. Thus, the high molecular weight compounds become insoluble.

The support used in the present invention is not particularly limited. However, it is necessary to choose materials whose quality does not change, which are not deformed during the processings of the recording materials or which do not dissolve in the solvents used.

Both transparent and opaque materials can be used as a support. For example, it is possible to use a paper impermeable to coating solutions containing the recording layer composition, artificial paper, films or sheets composed of synthetic resins such as polyesters, cellulose triacetate, polypropylene or polyvinyl chloride, etc., glass, anodically oxidized aluminum plates, plates or foils of metals such as aluminum, copper or zinc, etc., and plastic films on which the above-described metal has been plated by vacuum evaporation or laminated. Further, the surface of such supports can be subbed with a subbing layer or can be processed so as to improve the adhesive property of the support to the heat-sensitive recording layer containing the high molecular weight material. For example, it is possible to provide a subbing layer composed of gelatin, glue, casein or polyvinyl alcohol (with polyvinyl alcohols having a degree of saponification of less than 95% being preferred).

The recording materials of the present invention can be produced as follows.

The above-described high molecular weight compound is dissolved in a suitable polar solvent such as water or an alcohol and the resulting solution is coated on a surface of the above-described support. Although the amount of the high molecular weight compound in the coating solution can be appropriately varied, a suitable amount generally ranges from about 0.01 to about 10 wt% from the viewpoint of working properties. The coating can be carried out using known methods such as by wire bar coating, roll coating, kiss coating, doctor coating or casting, etc. Although the thickness of the coating layer is not limited, a thickness ranging from about 5 to 50μ, and preferably 10 to 40μ, is preferred from the viewpoint of sensitivity, resolving power and hiding power. Drying is carried out under conditions in which the above-described granular state is not destroyed, particularly, with attention to temperature. In general, the coating layer is dried using, e.g., warm air at a temperature of lower than about 70° C., more generally at about 30° to about 60° C., for about 3 to about 20 minutes. Although it is not necessary to completely remove the solvent, it is generally preferred that the amount thereof is below about 50 wt%. Considering absorption of moisture, materials containing about 10 to about 30 wt% solvent are utilized generally. A suitable amount of the high molecular weight compound coated per unit area of the support generally can range from about 1 to about 50 $g/m^2$, preferably 5 to 30 $g/m^2$.

If necessary, various kinds of binders or additives can be added to the above-described coating solution.

In order to increase the mechanical strength of the recording layer, materials which have a film-forming ability and which are soluble in the same solvent as that used for the above-described granular high molecular weight compound, such as gelatin, glue, casein or polyvinyl alcohol (generally, those having a degree of saponification of about 95% or less), etc., are used as binders. The binders are used in an amount so as not to adversely affect the function of the recording layer of the present invention. More specifically, these binders can be generally used in an amount of about 0.1 to 10 wt% based on the heat-sensitive high molecular weight compound.

It is possible to form images by exposure to flash light with an exposure time of about $10^{-4}$ to about $10^{-2}$ second and an exposure energy of about 1 to about 10 joule/$cm^2$ by dispersing therein materials which absorb the light of exposure and change this energy into heat energy to the recording layer. These materials generally have a color ranging from blue to black, and a degree of light absorption higher than about 90%. Examples of such materials include deeply colored pigments such as Phthalocyanine Blue, Diamond Black or Phthalocyanine Green, etc., and inorganic pigments such as carbon black, graphite, Prussian blue, ultramarine or black iron oxide, etc. These materials are generally used in an amount of about 5 to about 50 wt% based on the recording layer composition.

Further, the above-described pigments or dyes can be used in order to color the layer. They can be suitably chosen depending on the end-use purposes. Examples of the dyes which can be used include acid dyes, basic dyes and direct dyes. Examples of such include direct dyes such as Direct Pure Yellow 5G (C.I. 13920, Ciba Co., Ltd.), Benzo Red 3B (C.I. 23620, Farbenfabriken Bayer A.G.) or Direct Sky Blue (C.I. 24400, Hodogaya Chemical Co.), acid dyes such as Brilliant Sulfo Flavine FF (C.I. 56205, Farbwerke Hoechst A.G.) or Sulfo Rhodamine B (C.I. 45100, Farbwerke Hoechst A.G.) and basic dyes such as Auramine Occ (C.I. 41000, Badische Aniline & Soda Fabrik A.G.), Rhodamine 6GBN (C.I. 45160, Imperial Chemical Industries Ltd.), Methylene Blue FZ (C.I. 52015, Hodogaya Chemical Co.) or Crystal Violet ex. pdr. (C.I. 42555, Badische Aniline & Soda Farbik A.G.). Generally, the dyes are used in an amount of about 0.001 to about 1 wt% based on the recording layer composition.

Where images are formed utilizing dielectric heating of the recording layer by applying a high frequency electric field to the recording layer, powders of dielectric materials having a dielectric constant above about 2, and preferably above 5, and a dielectric loss tangent of above about $1 \times 10^{-4}$, for example, inorganic or organic compounds such as titanium oxide, zinc oxide, aluminum oxide, magnesium oxide, calcium oxide, barium titanate, iron titanate, phenol resins, melamine resins or aniline resins, etc., are dispersed in the recording layer composition. A suitable amount of these dielectric materials is generally about 1 to about 50 wt%, and preferably 10 to 40 wt%, based on the recording layer composition. If the amount is higher than about 50 wt%, formation of the recording layer becomes difficult.

Further, where heat is to be applied to the heat-sensitive recording layer using an electric current and scanning with a needle electrode on the heat-sensitive recording layer to generate heat, electroconductive materials, and preferably those having an electric resistance of less than about 1 Ω/cm, such as carbon black, graphite, or powders of metals, such as aluminum, zinc, copper, magnesium or silver, etc., are dispersed in the recording layer in order to render the layer electroconductive. A suitable amount of these electroconductive materials is such that the electric resistance of the recording layer is about 1 to about 100 kΩ, which generally is a range of about 1 to about 50 wt%, and preferably 10 to 40 wt% based on the recording layer composition.

Where particles of solid materials and additives as described above are employed, the particle size of these materials preferably ranges from about 0.1 to about 10μ.

In the present invention, plasticizers can be added, if necessary. Examples of suitable plasticizers include glycerin, ethylene glycol, dioctyl phthalate, dibutyl phthalate and tricresyl phosphate, etc. Where the solvent used for the coating solution is a polar solvent such as an alcohol, or dimethylformamide, etc., the above-described ester type plasticizers are preferred. A suitable amount of the plasticizer generally ranges from about 0.1 to 10 wt% based on the recording layer composition.

In order to improve the mechanical strength of the recording layer, it is possible to incorporate other high molecular weight compounds in the recording layer as binders. However, addition of the high molecular weight compounds results in a reduction of the degree of selective insolubilization of the recording layer caused by insolubilization of the heat-sensitive high molecular weight compound due to application of heat to the recording layer. As the amount of the other high molecular weight compounds increases, image formation becomes difficult and the images finally cannot be obtained after application of heat, because all of the recording layer is soluble in the solvent used. Accordingly, these other high molecular weight compounds as binders can be employed only in an amount up to which substantial image formation can be obtained, that is, below about 10 wt% based on the heat-sensitive high molecular weight compound. In adding in such an amount, heat-sensitive recording layers having sufficient strength sometimes cannot be obtained. Particularly, such a tendency appears when a globular protein is used as the heat-sensitive high molecular weight compound.

In such cases, one or more water-soluble low molecular weight compounds selected from acid amides, thioacid amides, imides, oxycarboxylic acids and alkali metal salts thereof (for example, salts of Li, Na or K), polyhydric alcohols and nitrogen containing cyclic compounds are added to the recording layer, by which a good film-forming property can be obtained without deterioration of the image-forming property. Examples of acid amides are compounds represented by the formula $R_7CONH_2$ (where $R_7$ represents an alkyl group having 1 to 20 carbon atoms, a vinyl group or an aryl group having 6 to 20 carbon atoms) and specific examples of such amides include acetamide (boiling point: 220° C.), and acrylamide (boiling point at 25 mmHg: 125° C.). Other compounds are, for example, acid amides such as nicotinamide (boiling point: 121° C.), imides such as urea (boiling point: 135° C.) and ε-caprolactam (boiling point at 12 mmHg: 139° C.), glucose (melting point: 205° C.), oxycarboxylic acids and salts thereof such as citric acid (melting point: 153° C.), sodium gluconate (melting point: above 100° C.) and sodium succinate (melting point: above 100° C.), polyhydric alcohols such as ethylene glycol (boiling point: 197° C.) and glycerin (boiling point: 154° C. at 5 mmHg), and nitrogen containing cyclic compounds such as hexamethylenetetramine (melting point: 280° C.), wherein those which are solid or liquid at room temperature (about 20° to 30° C.) and have a boiling point of above 100° C. are preferred.

The above-described compounds can be used together with the above-described materials having a film-forming property. A suitable amount of the low molecular weight compounds which can be used ranges from about 0.2 to about 1.2 wt%, and preferably 0.5 to 1.0 wt%, based on the recording layer composition. Where the amount is below about 0.2 wt%, effects due to the addition of these compounds are not sufficient. Where the amount is above about 1.2 wt.%, insolubilization upon heating becomes difficult. These compounds are particularly effective when used together with globular proteins such as albumin.

In addition, it is possible to use known surface active agents as dispersing agents for the above-described additives in the recording layer composition. Examples of surface active agents include polyoxyethylene alkyl ethers, polyoxyethylene alkylphenyl ethers (with examples of suitable alkyl groups being lauryl, cetyl, stearyl, oleyl, octyl and nonyl groups), sorbitan fatty acids, polyethylene sorbitan fatty acid esters (for example, laurate, stearate or oleate, etc.), stearyl monoglyceride and oleyl monoglyceride. Further, it is possible to use alcohols having a low boiling point of about 60° to about 100° C. (those having a boiling point which permits evaporating at the drying temperature) such as methyl alcohol, ethyl alcohol, propyl alcohol or isopropyl alcohol as dispersing agents. The above-described binders such as gelatin can be used as dispersing agents. The surface active agents can be used generally in an amount of about 0.001 to 10 wt%, and preferably 0.01 to 1 wt%, based on the recording layer composition. Alcohols having a low boiling point of about 60° to about 100° C. can be used generally in an amount of about 5 to about 30 wt% based on the coating solution of the recording layer composition. In using gelatin in the dispersion, the gelatin can be used generally in an amount of about 0.1 to 10 wt% based on the recording layer composition.

The amount of the heat-sensitive high molecular weight compound in the recording layer in the present invention generally ranges from about 30 to about 100 wt%, and preferably 50 to 100 wt%, based on the recording layer composition.

In the present invention, two or more heat-sensitive high molecular weight compounds, binders and other additives may be used in admixture, if desired.

Those of the above-described additives which are added as particles are previously dispersed in a solvent for the heat-sensitive high molecular weight compound to be used using a surface active agent or a high molecular weight compound and then the resulting dispersion is added to a solution of the heat-sensitive high molecular weight compound. Further, dyes or film-forming materials which are soluble in solvents can be added directly or as a solution thereof to the solution of the heat-sensitive high molecular weight compound.

In order to improve the mechanical strength or moisture resistance property of the recording layer of the present invention, a protective layer can be provided, if necessary, on a surface of the recording layer. Materials which are dissolved in solvents used in development of the recording layer are generally used for the protective layer. For example, polymers such as polyvinyl alcohol, gelatin, glue and casein can be used. Although waxes such as paraffin or carnauba wax may be used, development in such cases is suitably carried out by wiping the surface during development. A suitable thickness of the proetctive layer is generally about 1 to about 5μ.

In order to imagewise apply heat to the recording layer of the heat-sensitive recording materials of the present invention, known methods can be used. For example, a method of applying infrared rays, a method which comprises exposing the recording layer to light such as ultraviolet rays, visible rays or infrared rays, namely, applying light energy in an amount of about 1 to about 3 $J/cm^2$ for about 1/100 to about 1/1,000 second using a xenon flash light source of about 2,000 to about 3,000 WS, to convert the light energy into heat in the recording layer, a method of utilizing dielectric heating which comprises applying a high frequency field, for example, applying a high frequency field of about 100 to about 400 KHz and about 100 to about 500 W between a needle electrode or pattern electrode close to or contacting the recording layer and a counter electrode provided on the back of the recording film, to generate heat dielectrically, and a method which comprises applying a direct current or an alternating current to the recroding layer, for example, contacting a needle electrode with the recording layer and applying a voltage of a direct or alternating current of about 10 to about 100 V (0 to 1,000 Hz, more generally 0 to about 60 Hz) to generate Joule's heat in the recording layer. These methods can be suitably used depending on the materials included in the recording layer.

Generally, application of heat is carried out using the above-described methods while closely contacting an original on the recording layer.

The heat-sensitive high molecular weight compound in the portion of the recording layer where heat was applied is insolubilized. It is generally necessary for the high molecular weight compound to be heated to about 90° C. in order to insolubilize the compound, although this depends upon the kind of high molecular weight compound(s) and additive(s) in the recording layer. For such a purpose, it is necessary to apply energy in an amount of about 1.2 to 3.1 joules/cm$^2$. It seems that the high molecular weight compound used in the present invention undergoes a physical change from a folded structure and, consequently, the solubility changes.

After application of the heat, the recording layer is developed using a suitable solvent to remove by dissolving the high molecular weight compound which was not insolubilized, by which images composed of the recording layer containing the insolubilized high molecular weight compound are obtained.

Any solvent can be used if it dissolves the heat-sensitive high molecular weight compound. Although water is most preferred from the viewpoint of handling and economy, alcohols such as methyl alcohol, ethyl alcohol, propyl alcohol, isopropyl alcohol or butyl alcohol, etc., dimethylformamide, polyhydric alcohols and derivatives thereof such as ethylene glycol or Cellosolve and ketones such as acetone, methyl ethyl ketone, or methyl isobutyl ketone, etc., can be used.

The development, namely, removal of the high molecular weight compound which was not insolubilized due to heat can be carried out at normal temperature, namely, about 10° to 30° C., and usually 20° to 25° C., and heating or cooling is not required. Although any method can be chosen for development as long as removal of only the portion of the high molecular weight compound which was not insolubilized is achieved, shower development, wipe development, spray development and dip development are generally utilized. The development is carried out generally in about 5 seconds to about 10 minutes.

Colored images can be obtained from the thus resulting images by applying a solution of a dye(s), capable of dyeing only the residual recording layer, to the recording layer or by dipping the recording layer in such a solution of a dye(s). An aqueous solution or an alcoholic solution of the above-described direct dyes, acid dyes or basic dyes can be used. The concentration of the dye solution is usually about 1 to about 5 wt%.

If the heat-sensitive materials of the present invention are used, it is possible to easily obtain images by applying a lower amount of heat energy than that required in the thermal changes utilized in known heat-sensitive recording materials, such as melting, color forming, polymerization, cross linking, depolymerization or decomposition, etc. Further, since the change in solubility by application of heat is sufficiently large, distinct images can be easily obtained. Furthermore, an advantage of the present invention is that the development can be carried out using water at room temperature (about 20°-30° C.). Moreover, since the high molecular weight compounds used in the present invention have high sensitivity, the quality of the originals is not injured upon application of heat, because the originals need not be exposed to light for a long period of time or at a high temperature.

The following examples are given to illustrate the present invention in greater detail. Unless otherwise indicated, all parts, percents, ratios and the like are by weight.

EXAMPLE 1

10 g of powdery egg albumin (those produced by Koso Chemical Co., Ltd., Kanto Chemical Co., Ltd., Wako Pure Chemical Industry, Ltd., Tokyo Chemical Industry Co., Ltd., E. Merck Japan Ltd., and Pfaltz and Bauer Inc. were used respectively) was added to 30 g of distilled water and the mixture was allowed to stand over night to sufficiently swell the egg albumin. The albumin was then dissolved with stirring at 20° to 30° C. The solution was then filtered using filter paper to remove a very small amount of insoluble materials, by which a 25% aqueous solution of albumin was obtained. Although the amount of insoluble materials somewhat differed according to the brand of egg albumin, there was no substantial interference in carrying out the present invention.

The above-described aqueous solution of albumin was applied as a coating solution to a polyester film having a thickness of 100μ using a wire bar (Rod No. 9 made by R.D. Specialities, U.S.A.) and dried for 10 minutes with warm air at 30° C. to form a recording layer having a dry weight of about 5 g/m$^2$.

The recording layer of the resulting heat-sensitive recording film was brought into close contact with a black positive line drawing (an original such as that printed with black ink, wherein infrared rays are effectively absorbed and an increase of temperature at the image portion is markedly larger than that at the non-image portion). Infrared rays were then applied to the recording film through the original using a Thermofax copying device Model 45C (equipped with a 1,500 W infrared lamp having a length of 30 cm made by Minnesota Mining and Manufacturing Co. U.S.A.) at a distance of 1 cm while moving the recording film at a rate of 2-5 cm/second. The recording film was then washed with running water (at 22°-25° C.) for about 1 minute to remove the recording layer corresponding to the non-image portion of the original by dissolution, by which a relief image was obtained. Further, the above-described recording film was dipped in a 5% solution of Methylene Blue in alcohol for about 1 minute and washed with water to obtain a distinct blue visible image.

The same result as described above was obtained using each of the above-described egg albumins.

EXAMPLE 2

An aqueous solution of albumin was prepared in the same manner as in Example 1 except that cattle serum albumin (those produced by Kanto Chemical Co., Ltd. and Wako Pure Chemical Industry, Ltd. were used respectively) was used instead of egg albumin. Using the resulting aqueous solution of albumin in the same manner as in Example 1, a heat-sensitive recording film was produced. The same result as in Example 1 was obtained.

EXAMPLE 3

An aqueous solution of albumin was prepared in the same manner as in Example 1 except that milk albumin (produced by Tokyo Chemical Industry Co., Ltd.) was used instead of the egg albumin. Using the resulting aqueous solution of albumin in the same manner as in Example 1, a heat-sensitive recording film was produced, and the same result as in Example 1 was obtained.

EXAMPLE 4

To 10 g of a 25% aqueous solution of albumin prepared in the same manner as in Example 1, 1 g of Crystal Violet was added and dissolved. The solution was applied to a polyester film having a thickness of 100μ using a wire bar, No. 9 and dried with warm air at 30° C. for 10 minutes to form a recording layer having a dry weight of 6 $g/m^2$.

The recording layer of the resulting heat-sensitive recording film was brought into close contact with a reflection original having a black positive line drawing. Infrared rays were then applied to the recording film at the film side using the apparatus described in Example 1. The recording film was then washed with running water in the same manner as in Example 1 to remove the recording layer corresponding to the non-image portion of the original by dissolution, by which a distinct blue image was obtained.

EXAMPLE 5

After 2 g of carbon black having a particle size of 0.5–5μ (produced by Koso Chemical Co., Ltd.) was wet well with 5 g of ethyl alcohol, 17 g of distilled water was added thereto. The mixture was dispersed ultrasonically to produce 20 g of a dispersion containing 10 wt% carbon black.

To 5 g of each of an aqueous solution of albumin prepared in the same manner as in Examples 1, 2 and 3, respectively, 3.5 g of the above-described carbon black dispersion was incrementally added dropwise while exposing the solution to ultrasonic waves to prepare a black coating solution. Each resulting coating solution was applied to a polyester film having a thickness of 100μ using the above-described wire bar No. 9 and dried with warm air at 30° C. for 10 minutes to produce a black recording layer having a dry weight of about 3.5 $g/m^2$.

A transparent original having a negative line drawing was put on each resulting heat-sensitive recording film. Each recording film was then exposed to light through the original using a xenon flash light source (Riso Torapen UP TU-270, produced by Riso Kagaku Corp., flash time: 1/1,000 second and light intensity: 1.8 joules). Each recording film was then washed with running water in the same manner as in Example 1 to obtain a black positive image.

EXAMPLE 6

A mixture of 10 g of carbon black having a particle size of 0.5–5μ (MA-100, produced by Mitsubishi Chemical Industries, Ltd.), 10 g of a 10% aqueous solution of polyvinylpyrrolidone (K-90, produced by General Aniline and Film Co., molecular weight: about 360,000), 1 g of polyethylene glycol #6000 (produced by Kanto Chemical Co., Ltd., molecular weight: about 6,000) and 78 g of water was dispersed for 48 hours using a ball mill to prepare a 10% carbon black dispersion. In this case, the polyvinylpyrrolidone and the polyethylene glycol were used as dispersing agents.

To 10 g of each of an aqueous solution of albumin prepared in the same manner as in Examples 1, 2 and 3, 25 g of the above-described carbon black dispersion was added, and each mixture was dispersed ultrasonically to produce a black coating solution.

Each resulting coating solution was applied to a polyester film having a thickness of 100μ using a wire bar (Rod No. 12, made by R.D. Specialities) and dried with warm air at 30° C. to form a recording layer having a dry weight of about 3 $g/m^2$.

Each resulting recording film was exposed to a flash light in the same manner as in Example 5, and thus a black positive image was obtained.

EXAMPLE 7

To a black heat-senstitive recording layer formed in the same manner as in Example 6, a 15% solution of polyvinylpyrrolidone (K-90) in ethanol was applied using wire bar No. 9 and dried with warm air at 30° C. for 5 minutes to form a protective layer having a dry weight of about 1.5 $g/m^2$.

The heat-sensitive recording film having the protective layer was set on a copying apparatus Gakkenfax Model GOM-208N (scanning current application type copying apparatus made by Gakken Co., Ltd.) and scan recording was carried out using an original having a line drawing by contacting a needle electrode having a diameter of 200μ with the recording layer at 18 KHz and 100 V.

The recording film was then washed with running water at 22°–25° C. for 1 minute to produce a black image corresponding to the original.

EXAMPLE 8

10 g of powdery albumin (produced by Koso Chemical Co., Ltd.) was added to 30 g of distilled water. After the solution was allowed to stand over night, the mixture was stirred to dissolve, and was then filtered using filter paper to prepare a 25% aqueous solution of albumin.

To 5 g of the aqueous solution of albumin, 3 g of a 20% aqueous solution of acrylamide was added, and the resulting mixture was stirred to prepare a coating solution.

The resulting coating solution was applied to a polyester film having a thickness of 100μ using a wire bar (Rod No. 10, made by R.D. Specialities) and dried at 40° C. for 10 minutes to form a recording layer.

The recording layer was brought into close contact with an original printed with a black ink and infrared rays were applied in the same manner as in Example 1 to the recording layer through the film base using a Thermofax copying apparatus Model 45 (made by Minnesota Mining and Manufacturing Co.). The recording film was then treated with running water at 22°–25° C. for 1 minute to obtain a relief image corresponding to the original. The recording film having such a relief image was dipped in a 5% solution of Methylene Blue in alcohol at 22°–25° C. for about 1 minute and washed with water at 22°–25° C. for about 1 minute to obtain a distinct blue image.

EXAMPLE 9

3 g of a 20% aqueous solution of acrylamide was added to 5 g of a 25% aqueous solution of albumin, and 1 g of a 2% aqueous solution of a water soluble dye (Rhodamine B) was added thereto to prepare a coating solution. A recording layer was formed in the same manner as in Example 8 and heat was applied thereto. After the material was processed with running water as in Example 8, a distinct red image was obtained.

EXAMPLE 10

A coating solution of 5 g of a 25% aqueous solution of albumin, 1.5 g of a 25% aqueous solution of ε-caprolactam, 1.5 g of a 25% aqueous solution of glycerin and 1 g of a 1% aqueous solution of a water soluble dye (Acid Violet) was prepared. A recording layer was formed in the same manner as in Example 8 and heat was applied thereto. After treatment with running water as in Example 8, a distinct blue image was obtained.

EXAMPLE 11

A mixture of 10 g of carbon black having a particle size of 0.5–5μ (produced by Koso Chemical Co., Ltd.), 10 g of a 10% aqueous solution of polyvinylpyrrolidone (K-90) as a dispersing agent and 80 g of water was dispersed using a ball mill for 24 hours to prepare a 10% carbon black dispersion.

10 g of the above-described 10% carbon black dispersion was mixed with 5 g of a 25% aqueous solution of albumin and 3 g of a 20% aqueous solution of acetamide. The mixture was ultrasonically dispersed for 1 minute to prepare a coating solution, which was applied to a polyester film having a thickness of 100μ using the above-described wire bar, No. 10, and dried at 40° C. for 5 minutes to form a recording layer.

A transparent original having a negative image was brought into close contact with the resulting recording layer and the recording film was exposed to a flash light (Riso Torapen UP TU-270 described in Example 5, flash time: $10^{-3}$ second, flash light output: 1,400 WS) at an exposure control dial setting of 1. The recording film was then treated with running water at 22°–25° C. for 1 minute to obtain a black positive image. The resulting iamge had a transmission density of about 4.0 and a resolving power of about 16/mm.

EXAMPLE 12

A mixture of 10 g of powdery graphite having a particle size of 1–5μ (commercially available graphite powder), 10 g of a 10% aqueous solution of polyvinylpyrrolidone (K-90) and 10 g of water was dispersed for 48 hours using a ball mill to produce a 10% graphite carbon dispersion.

10 g of the resulting 10% graphite carbon dispersion was mixed with 5 g of a 25% aqueous solution of albumin and 3 g of a 20% aqueous solution of urea and the mixture was ultrasonically dispersed for 1 minute to produce a coating solution.

Using the resulting coating solution, a recording layer was formed in the same manner as in Example 11, which was then exposed to a flash light through a negative original in the same manner as in Example 11. The recording film was then treated with running water at 22°–25° C. for 1 minute to obtain a black positive image.

EXAMPLE 13

10 g of a 10% carbon black dispersion (particle size of carbon black: 0.5–5μ) was mixed with 5 g of a 25% aqueous solution of albumin, 1.5 g of a 25% aqueous solution of ε-caprolactam and 1.5 g of a 25% aqueous solution of glycerin, and the mixture was ultrasonically dispersed for 1 minute to produce a coating solution.

Using the resulting coating solution, a recording layer was formed in the same manner as in Example 11, which was then exposed to a flash light through a negative original in the same manner as in Example 11. The recording film was then treated with running water at 22°–25° C. for 1 minute to obtain a black positive image.

EXAMPLE 14

10 g of a 10% carbon black dispersion (particle size of carbon black: 0.5–5μ) as used in Example 11 was mixed with 5 g of a 25% aqueous solution of albumin and 3 g of a 25% aqueous solution of thioacetamide, and the mixture was ultrasonically dispersed for 1 minute to produce a coating solution.

Using the resulting coating solution, a recording layer was formed in the same manner as in Example 11, which was then exposed to a flash light through a negative original in the same manner as in Example 11. The recording film was then treated with running water at 22°–25° C. for 1 minute to obtain a black positive image.

EXAMPLE 15

10 g of a 10% carbon black dispersion (particle size of carbon black: 0.5–5μ) was mixed with 5 g of a 25% aqueous solution of albumin and 3 g of a 25% aqueous solution of hexamethylenetetramine, and the mixture was ultrasonically dispersed for 1 minute to produce a coating solution.

Using the resulting coating solution, a recording layer was formed in the same manner as in Example 11, which was then exposed to a flash light through a negative original in the same manner as in Example 11. The recording film was then treated with running water at 22°–25° C. for 1 minute to obtain a black positive image.

EXAMPLE 16

10 g of a 10% carbon black dispersion (particle size of carbon black: 0.5–5μ) was mixed with 5 g of a 25% aqueous solution of albumin and 3 g of a 25% aqueous solution of nicotinamide, and the resulting mixture was ultrasonically dispersed for 1 minute to produce a coating solution.

Using the resulting coating solution, a recording layer was formed in the same manner as in Example 11, which was then exposed to a flash light through a negative original in the same manner as in Example 11. The recording film was then treated with running water at 22°–25° C. for 1 minute to obtain a black positive image.

EXAMPLE 17

A mixture of 10 g of Cyanine Blue GR (produced by Dai-Nippon Ink & Chemical Mfg. Co., Ltd.), 10 g of a 10% aqueous solution of polyvinylpyrrolidone (K-90) and 80 g of water was dispersed for 24 hours using a ball mill to produce a 10% Cyanine Blue dispersion.

10 g of the above-described Cyanine Blue dispersion was mixed with 5 g of a 25% aqueous solution of albumin, 1.5 g of a 25% aqueous solution of ε-caprolactam and 1.5 g of a 25% aqueous solution of glycerin, and the mixture was ultrasonically dispersed for 1 minute to produce a coating solution.

Using the resulting coating solution, a recording layer was formed in the same manner as in Example 11, which was then exposed to a flash light through a negative original using Trapen UP TU-270 at an exposure control dial setting of 2 (flash time: 1/1,000 sec., light intensity: 2.0 joules/$cm^2$). The recording material was then treated with running water at 22°–25° C. for 1 minute to obtain a blue positive image.

EXAMPLE 18

10 g of a 10% graphite dispersion (particle size of graphite: 1–5μ) was mixed with 5 g of a 25% aqueous solution of albumin and 3 g of a 30% aqueous solution of glucose, and the mixture was ultrasonically dispersed for 1 minute to produce a coating solution.

The resulting coating solution was applied to the aluminum surface of an aluminum foil laminated polyester film using the above-described wire bar No. 10 and dried at 40° C. for 5 minutes to form a recording layer.

Using the resulting recording film, scan recording was carried out using a recording needle having a diameter of 200μ at 18 KHz and 1,000 V using a Gakkenfax Model GOM-208N (made by Gakken Co.). The recording film was then treated with running water at 22°–25° C. for 1 minute to obtain a black image.

EXAMPLE 19

1 g of carbon black having a particle size of 0.5–5μ (MA-100, produced by Mitsubishi Chemical Industries, Ltd.) was added to 9 g of a water soluble resin (U-Ramin T-1100, produced by Toyo Koatsu Chemical Co., copolymer of vinyl acetate and acrylic acid, solid content: 10%, aqueous solution), and the mixture was ultrasonically dispersed for 5 minutes to produce a black coating solution. This coating solution was applied to a polyester film having a thickness of 75μ using a wire bar No. 22 (made by R.D. Specialities), and dried with warm air at 35° C. for 10 minutes to form a recording layer having a dry weight of about 9 g/m².

An original having a negative line drawing was brought into close contact with the recording layer of the resulting recording film. Light energy of 3.1 J/cm² was applied to the recording layer for 1/1,000 second using a xenon flash light source (Riso Xenonfax FX-150, made by Riso Kagaku Corp.). The recording layer was then shower developed for 1 minute using city water at 22°–25° C. to remove the recording layer which was not exposed to light by dissolution, by which a black positive image having a transmission density of about 3.0 was obtained.

EXAMPLE 20

1 g of polyethylene oxide (PEO-8, produced by Seitetsu Kagaku Co., Ltd., average molecular weight: $1.0 \times 10^6$–$1.7 \times 10^6$) and 1 g of carbon black (MA-100) were added to 8 g of water, and the mixture was ultrasonically dispersed for 5 minutes to produce a black coating solution. The resulting coating solution was applied to a polyester film having a thickness of 75μ using the above-described wire bar No. 22 and dried with warm air at 35° C. for 10 minutes to form a recording layer having a dry weight of about 10 g/m². The resulting recording film was exposed to light in the same manner as in Example 19 and then developed using city water to obtain a black positive image having a transmission density of about 3.0.

EXAMPLE 21

20 g of a 5% aqueous solution of the Na salt of β-naphthalene sulfonic acid-formaldehyde condensation product (dispersing agent for use in water, Demol N, produced by Kao Atlas Co., Ltd.) and 10 g of carbon black (MA-100) were added to 70 g of water, and the mixture was dispersed for 24 hours using a ball mill to produce a black dispersion. To 5 g of the dispersion, 5 g of a water soluble vinyl acrylic resin (U-Ramin T-1100, solid content: 10%, aqueous solution) was added to prepare a coating solution.

The resulting coating solution was applied to a polyester film having a thickness of 75μ using the above-described wire bar No. 22 and dried with warm air at 35° C. for 10 minutes to form a recording layer having a dry weight of about 10 g/m².

Light energy of 2.6 J/cm² was applied to the resulting recording film for 1/1,000 second using the same xenon flash light source as in Example 19. The recording film was then developed using city water (at 22°–25° C. for 1 minute) to obtain a positive image having a transmission density of about 3.0.

EXAMPLE 22

To 5 g of the dispersion in Example 21, a 2% aqueous solution of polyethylene oxide (PEO-8) was added to prepare a coating solution.

Using the resulting coating solution, a recording layer was formed in the same manner as in Example 19, which was exposed to a flash light and developed using city water (at 22° to 25° C. for 1 minute) to obtain a black positive image.

EXAMPLE 23

To 5 g of the dispersion in Example 21, a 2 wt% aqueous solution of hydroxyethyl cellulose (BL-15, produced by Asahi Kagaku Co., molecular weight: about 80,000, degree of etherification: 20%) was added to prepare a coating solution, and a recording film was produced in the same manner as in Example 19.

Using the resulting recording film, exposure and development were carried out in the same manner as in Example 19 to obtain a black positive image.

EXAMPLE 24

To 5 g of the dispersion in Example 21, 5 g of a 2 wt% aqueous solution of methyl cellulose (Metholose 60SH, produced by Shinetsu Chemical Industry, Co., Ltd., molecular weight: about 80,000–90,000, degree of etherification: 20%) was added to prepare a coating solution, and a recording film was produced in the same manner as in Example 19. Exposure and development were carried out in the same manner as in Example 19 to obtain a black positive image.

EXAMPLE 25

To 5 g of the dispersion in Example 21, 5 g of a 2 wt% aqueous solution of sodium alginate (produced by Kanto Chemical Co., Inc.) was added to prepare a coating solution, and a recording film was produced in the same manner as in Example 19. Exposure and development were carried out in the same manner as in Example 19 to obtain a black positive image.

EXAMPLE 26

To 5 g of the dispersion in Example 21, 5 g of a 2 wt% aqueous solution of polyacrylamide (PAA-70L, produced by Nitto Chemical Industry Co., Ltd., molecular weight: about 50,000 to 100,000) was added to prepare a coating solution, and a recording film was produced in the same manner as in Example 19. Exposure and development were carried out in the same manner as in Example 19 to obtain a black positive image.

EXAMPLE 27

To 5 g of the coating solution in Example 21, 5 g of ethyl alcohol was added. The mixture was applied to a polyester film using a wire bar No. 44 (made by R.D. Specialities), and dried with warm air at 35° C. for 5 minutes to form a recording layer.

Using the resulting recording film, exposure was carried out in the same manner as in Example 19 and the non-exposed portion was removed by dissolving with ethyl alcohol (at 22°–25° C. for 1 minute, dip development) to obtain a black positive image.

EXAMPLE 28

To 5 g of the dispersion in Example 21, 2.5 g of a 10 wt% solution of polyvinylpyrrolidone (K-90) in ethyl alcohol and 5 g of a 10 wt% aqueous solution of a plasticizer (dioctyl phthalate (DOP)) were added to prepare a coating solution.

Using the resulting coating solution, a recording film was formed in the same manner as in Example 19. Light energy of 2.2 J/cm$^2$ was applied to the recording film for 1/1,000 second using a xenon flash light source. The recording film was then developed using city water (at 22°–25° C. for 1 minute) to obtain a black positive image.

EXAMPLE 29

To 5 g of the dispersion as described in Example 21 was added 5 g of a 5 wt% aqueous solution of a vinylmethyl ether/maleic acid anhydride copolymer (GANTREZ AN-139, produced by General Aniline and Film Corp., monomer ratio = 1:1) to prepare a coating solution. Thus, a recording film was produced in the same manner as described in Example 19.

Using the resulting recording film, exposure and development were carried out in the same manner as in Example 19 to obtain a black positive image.

EXAMPLE 30

To 5 g of the dispersion as described in Example 21 was added 2.5 g of a 10 wt% aqueous solution of a vinyl acetate/acrylic acid copolymer (Polysol 7Z4, produced by Showa High Polymer Co., Ltd., monomer ratio = 6:4) to prepare a coating solution. Thus, a recording film was produced in the same manner as described in Example 19.

Using the resulting recording film, exposure and development were carried out in the same manner as in Example 19 to obtain a black positive image.

EXAMPLE 31

20 g of a 10 wt% solution of polyvinylpyrrolidone (K-90, produced by General Aniline and Film Corp.) in ethyl alcohol and 10 g of carbon black (MA-100) were added to 70 g of ethyl alcohol, and the resulting mixture was dispersed for 48 hours using a ball mill to prepare a black dispersion.

The resulting dispersion was applied to a polyester film using the above-described wire bar No. 22 and dried at 35° C. for 5 minutes to form a recording layer having a dry weight of about 6.5 g/m$^2$.

Using the resulting recording film, exposure and development were carried out in the same manner as in Example 19 to obtain a black positive image having a transmission density of about 3.0.

EXAMPLE 32

0.5 g of Crystal Violet was added to 1.0 g of a 10 wt% solution of polyvinylpyrrolidone (K-90) in ethyl alcohol. The resulting mixture was applied to a polyester film having a thickness of 75μ and dried with warm air at 35° C. for 5 minutes to form a recording layer having a dry weight of 2.5 g/m$^2$.

An original having a black positive line pattern was brought into close contact with the recording layer of the resulting recording film. Infrared rays were applied to the recording layer through the original using a thermocopying apparatus (Thermofax Copying Apparatus Model 45C, made by Minnesota Mining and Manufacturing Co.). The recording film was then shower developed using city water (at 22°–25° C. for 1 minute) to obtain a positive blue image corresponding to the original.

EXAMPLE 33

1 g of a barium titanate powder was added to 9 g of a water soluble vinyl acrylic resin (U-Ramin T-1100, 10 wt% aqueous solution) and the mixture was ultrasonically dispersed for 5 minutes to prepare a white coating solution.

The resulting coating solution was applied to a laminated surface of an aluminum plated polyester film having a thickness of 75μ and dried with warm air at 35° C. for 10 minutes to form a recording layer having a dry weight of about 8 g/m$^2$.

The resulting recording film was wound on a conductive drum. A recording needle of a metal type to which a high frequency field of 150 MHz and 150 W was applied was brought into contact with the recording layer to generate a heat pattern in the recording layer. The recording film was then subjected to shower development using city water (at 22°–25° C. for 1 minute) to obtain a white image corresponding to the heat pattern. The above-described high frequency was applied for 1/100 to 1/10 second.

EXAMPLE 34

To the recording layer formed in Example 21, a 1 wt% solution of purified beeswax in trichloroethylene was applied by spraying and dried to form a protective layer having a thickness of about 1μ. The resulting recording film was set on a Gakkenfax Model GOM-208N (scan electric current application type copying apparatus, made by Gakken Co.) and scan recording was carried out using an original having a line drawing at 18 KHz and 100 V.

The recording film was then dipped in water at 22°–25° C. for about 30 seconds and subjected to wipe development using a sponge to obtain a black image corresponding to the original.

While the invention has been described in detail and with reference to specific embodiments thereof, it will be apparent to one skilled in the art that various changes and modifications can be made therein without departing from the spirit and scope thereof.

What is claimed is:

1. A heat-sensitive recording material comprising a support and having thereon a recording layer comprising, as the heat-recording medium, a soluble heat-sensitive organic high molecular weight compound having a molecular weight between about 3,000 and 3,000,000, which is folded to show a granular state on the support, wherein said high molecular weight compound is selected from the group consisting of globular proteins and water soluble high molecular weight ethylene oxide compounds represented by the following formula (III):

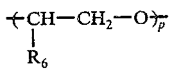

(III)

wherein $R_6$ represents H or $CH_3$ and $p$ is a positive integer.

2. The heat-sensitive recording material as set forth in claim 1, additionally including a protective layer on the recording layer.

3. The heat-sensitive recording material as set forth in claim 1, wherein the recording layer is dyed.

4. The heat-sensitive recording material as set forth in claim 1, wherein the heat-sensitive high molecular weight compound is said water soluble high molecular weight ethylene oxide.

5. The heat-sensitive recording material as set forth in claim 1, wherein the heat-sensitive high molecular weight compound is a globular protein.

6. The heat-sensitive recording material as set forth in claim 5, wherein the globular protein is albumin.

7. The heat-sensitive recording material as set forth in claim 1, wherein the recording layer contains a film-forming compound.

8. The heat-sensitive recording material as set forth in claim 7, wherein the film-forming compound is selected from the group consisting of gelatin, glue, casein and polyvinyl alcohol.

9. The heat-sensitive recording material as set forth in claim 7, wherein the amount of the film-forming compound in the recording layer is about 0.1 to about 10 wt% based on the recording layer composition.

10. The heat-sensitive recording material as set forth in claim 1, wherein the recording layer contains a material which absorbs light and converts such into heat.

11. The heat-sensitive recording material as set forth in claim 10, wherein the material which absorbs light and converts such into heat is selected from the group consisting of an organic pigment and an inorganic pigment.

12. The heat-sensitive recording material as set forth in claim 10, wherein the amount of the material which absorbs light and converts such into heat is about 5 to about 50 wt% based on the recording layer composition.

13. The heat-sensitive recording material as set forth in claim 1, wherein the recording layer contains particles of a dielectric material having a dielectric constant of above about 2 a dielectric loss tangent of above about $1 \times 10^{-4}$.

14. The heat-sensitive recording material as set forth in claim 13, wherein the dielectric material is selected from the group consisting of titanium oxide, zinc oxide, aluminum oxide, magnesium oxide, calcium oxide, barium titanate, iron titanate, a phenol resin, a melamine resin and an aniline resin.

15. The heat-sensitive recording material as set forth in claim 13, wherein the amount of the dielectric material in the recording layer is about 1 to about 50 wt% based on the recording layer composition.

16. The heat-sensitive recording material as set forth in claim 1, wherein the recording layer contains particles for an electroconductive material.

17. The heat-sensitive recording material as set forth in claim 16, wherein an amount of the electroconductive material is about 1 to about 50 wt% based on the recording layer composition.

18. The heat-sensitive recording material as set forth in claim 16, wherein the electroconductive material has an electric resistance of below about 1 Ω/cm.

19. The heat-sensitive recording material as set forth in claim 18, wherein the electroconductive material is selected from the group consisting of carbon black, graphite, aluminum, zinc, copper, magnesium and silver.

20. The heat-sensitive recording material as set forth in claim 1, wherein the recording layer contains at least one low molecular weight compound having a boiling point of above about 100° C. selected from the group consisting of an acid amide, a thioacid amide, animide, an oxycarboxylic acid and a salt thereof, a polyhydric alcohol and a nitrogen containing cyclic compound.

21. The heat-sensitive recording material as set forth in claim 20, wherein the heat-sensitive high molecular weight compound is a globular protein.

22. The heat-sensitive recording material as set forth in claim 20, wherein the recording layer contains at least one compound selected from the group consisting of acetamide, acrylamide, nicotinamide, urea, ε-caprolactam, glucose, citric acid, sodium gluconate, sodium succinate, ethylene glycol, glycerin and hexamethylenetetramine.

23. The heat-sensitive recording material as set forth in claim 20, wherein the amount of the low molecular weight compound in the recording layer is about 0.2 to about 1.2 wt% based on the recording layer composition.

* * * * *